United States Patent
Lee et al.

(10) Patent No.: US 10,454,099 B2
(45) Date of Patent: Oct. 22, 2019

(54) POSITIVE ACTIVE MATERIAL FOR RECHARGEABLE LITHIUIM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Young-hun Lee, Yongin-si (KR);
Ji-Yeon Jang, Yongin-si (KR);
Soon-Kie Hong, Yongin-si (KR);
Young-Ki Kim, Yongin-si (KR);
Soon-Rewl Lee, Yongin-si (KR);
Ick-Kyu Choi, Yongin-si (KR);
Ji-Hyun Kim, Yongin-si (KR);
Soo-Youn Park, Yongin-si (KR);
Hyun-Joo Je, Yongin-si (KR);
Chang-Wook Kim, Yongin-si (KR);
Kyu-Suk Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 144 days.

(21) Appl. No.: 15/613,716

(22) Filed: Jun. 5, 2017

(65) Prior Publication Data
US 2017/0358794 A1    Dec. 14, 2017

(30) Foreign Application Priority Data
Jun. 13, 2016    (KR) .......................... 10-2016-0073178

(51) Int. Cl.
*H01M 4/36* (2006.01)
*H01M 10/0525* (2010.01)
(Continued)

(52) U.S. Cl.
CPC ........... *H01M 4/364* (2013.01); *H01M 4/483* (2013.01); *H01M 4/525* (2013.01); *H01M 4/623* (2013.01);
(Continued)

(58) Field of Classification Search
CPC ....... H01M 10/0525; H01M 2004/028; H01M 4/364; H01M 4/483; H01M 4/525; H01M 4/623; H01M 4/625
See application file for complete search history.

(56) References Cited

U.S. PATENT DOCUMENTS

| 6,372,385 B1 | 4/2002 | Kweon et al. |
| 2002/0061444 A1 | 5/2002 | Kweon et al. |

(Continued)

FOREIGN PATENT DOCUMENTS

| JP | 11-97027 | 4/1999 |
| KR | 1999-0071411 A | 9/1999 |

(Continued)

*Primary Examiner* — Lingwen R Zeng
(74) *Attorney, Agent, or Firm* — Lewis Roca Rothgerber Christie LLP

(57) ABSTRACT

A positive active material for a rechargeable lithium battery and a rechargeable lithium battery including the same are disclosed. The positive active material includes a core including a lithium intercalation compound and a crystalline coating compound on a surface of the core and including a crystalline aluminum hydroxide, a crystalline aluminum oxyhydroxide, or a combination thereof.

6 Claims, 25 Drawing Sheets

(51) Int. Cl.
  *H01M 4/62* (2006.01)
  *H01M 4/48* (2010.01)
  *H01M 4/525* (2010.01)
  *H01M 4/02* (2006.01)

(52) U.S. Cl.
  CPC ....... *H01M 4/625* (2013.01); *H01M 10/0525* (2013.01); *H01M 2004/028* (2013.01)

(56) References Cited

U.S. PATENT DOCUMENTS

| | | | |
|---|---|---|---|
| 2002/0071990 A1* | 6/2002 | Kweon | C01G 45/1228 429/231.1 |
| 2004/0018429 A1 | 1/2004 | Kweon et al. | |
| 2006/0246352 A1 | 11/2006 | Kweon et al. | |
| 2015/0171423 A1* | 6/2015 | Kim | H01M 4/366 429/220 |

FOREIGN PATENT DOCUMENTS

| | | |
|---|---|---|
| KR | 2002-0028383 A | 4/2002 |
| KR | 2002-0087627 A | 11/2002 |
| KR | 10-2014-0081741 A | 7/2014 |

\* cited by examiner

POSITIVE ACTIVE MATERIAL FOR RECHARGEABLE LITHIUIM BATTERY AND RECHARGEABLE LITHIUM BATTERY INCLUDING SAME

CROSS-REFERENCE TO RELATED APPLICATION

This application claims priority to and the benefit of Korean Patent Application No. 10-2016-0073178 filed in the Korean Intellectual Property Office on Jun. 13, 2016, the entire contents of which are incorporated herein by reference.

BACKGROUND

1. Field

A positive active material for a rechargeable lithium battery and a rechargeable lithium battery including the same are disclosed.

2. Description of the Related Art

A rechargeable lithium battery has recently drawn attention as a power source for small portable electronic devices. The rechargeable lithium battery uses an organic electrolyte solution and thereby has twice or more as higher a discharge voltage than a battery using an alkali aqueous solution and accordingly, the rechargeable lithium battery has a relatively higher energy density.

As for a positive active material of a rechargeable lithium battery, a lithium-transition metal oxide having a structure capable of intercalating lithium ions, such as $LiCoO_2$, $LiMn_2O_4$, $LiNiO_2$, $LiNi_{1-x}Co_xO_2$ (0<x<1), and the like has been used.

As for a negative active material, various suitable carbon-based materials such as artificial graphite, natural graphite, and hard carbon, which intercalate and deintercalate lithium ions, and oxide materials such as tin oxide, lithium vanadium-based oxide, and the like have been used.

SUMMARY

An embodiment provides a positive active material for a rechargeable lithium battery having good cycle-life characteristics and storage characteristics.

An embodiment provides a rechargeable lithium battery including the positive active material.

According to an embodiment, a positive active material includes a core including a lithium intercalation compound and a crystalline coating compound disposed on a surface of the core and including a crystalline aluminum hydroxide, a crystalline aluminum oxyhydroxide, or a combination thereof.

An average particle diameter (D50) of the coating compound may be in a range of about 200 nm to about 1000 nm.

The coating compound may be present in an island form on the surface of the core.

A content of the coating compound may be in a range of about 0.05 mol % to about 2 mol % based on 100 mol % of the core.

The positive active material may further include a conductive material together with the coating compound on the surface of the core.

The coating compound may have a spherical shape or a sheet shape.

An embodiment provides a rechargeable lithium battery including a positive electrode including the positive active material, a negative electrode including a negative active material, and an electrolyte.

Embodiments of the present disclosure are further described in the following detailed description.

The positive active material for a rechargeable lithium battery according to an embodiment provides a rechargeable lithium battery having improved cycle-life characteristics and storage safety.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
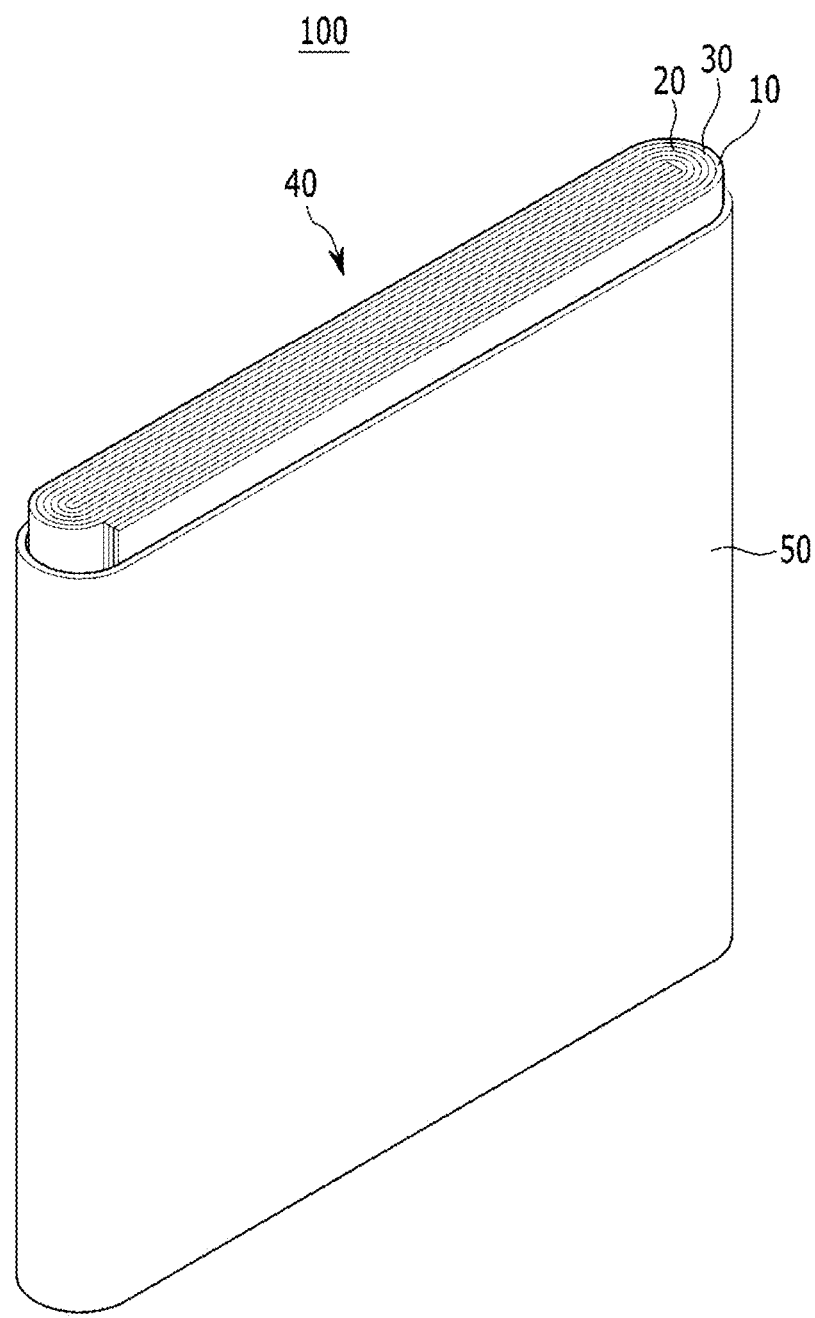
FIG. 1 is a schematic view showing a structure of a rechargeable lithium battery according to an embodiment.

Hereinafter, embodiments are described in more detail. However, these embodiments are exemplary, and do not limit the present invention. Embodiments of the present disclosure are defined by the scope of the appended claims and equivalents thereof.

A positive active material for a rechargeable lithium battery according to an embodiment includes a core including a lithium intercalation compound and a crystalline coating compound disposed on a surface of the core and including a crystalline aluminum hydroxide, a crystalline aluminum oxyhydroxide, or a combination thereof. As used herein, the terms "combination thereof" and "combinations thereof" may refer to a chemical combination (e.g., an alloy or chemical compound), a mixture, or a laminated structure of components.

The coating compound may react with hydrofluoric acid (HF) generated through decomposition of moisture and an electrolyte inside the battery and forming AlF$_3$ and thus play a scavenger role of removing the HF. This scavenger role may be more effectively played when the coating compound is a crystalline compound than an amorphous compound, since the crystalline compound has a lower moisture content and lower moisture adsorptivity than the amorphous compound. When the coating compound is an amorphous aluminum hydroxide or an amorphous aluminum oxyhydroxide, it highly contains moisture itself (e.g., it contains substantial amounts of moisture itself) and has excessively high moisture adsorptivity and thus has a problem in terms of a process management and a storage and in addition, promotes HF generation and thus may not be appropriately or suitably used as a scavenger.

In some embodiments, in this way, since the coating compound plays a role of the HF scavenger, a metal ion from a lithium intercalation compound, for example, Co$_4^+$ from LiCoO$_2$, during the charge may be suppressed from being eluted. Accordingly, since the metal ion is suppressed from being eluted from a positive active material (or such elution is reduced), the positive active material may be suppressed from collapse (or the likelihood or amount of such collapse may be reduced). For example, since the positive active material has a coating compound on the surface of the lithium intercalation compound as a core, the positive active material may effectively solve a problem that the lithium intercalation compound directly contacts and reacts with an electrolyte and promotes decomposition of the electrolyte and forms a film in a positive electrode, and resultantly, the film works as resistance and decreases internal resistance (IR) and capacity.

The coating compound may have an average particle diameter (D50) of about 200 nm to about 1000 nm. As used herein, when a definition is not otherwise provided, an average particle diameter (D50) indicates a particle where an accumulated volume is about 50 volume % in a particle distribution.

When the coating compound has an average particle diameter (D50) within the foregoing range, a speed and time may be appropriately or suitably adjusted during a coating process, and thus cycle-life characteristics and reliability may be improved, a bond between the core and the coating compound may also be improved, and the coating process may be more easily performed.

The coating compound may be present in an island form on the surface of the core. In other words, the coating compound is discontinuously present on the surface of the core as an island form, wherein the surface of the core is partially exposed. For example, the coating compound may be present as a plurality of discrete portions that are discontiguous with respect to one another. When the coating compound is continuously present and all covers the surface of the core (e.g., covers the entire surface of the core) as a layer form, lithium ions may be hindered from movement, and thus charges and discharges may not effectively occur.

A content of the coating compound may be in a range of about 0.05 mol % to about 2 mol % based on 100 mol % of the core. When the coating compound is used within the foregoing range, an effect of including the coating compound in an active material may be appropriately or suitably obtained without deteriorating capacity (or without substantially deteriorating capacity).

The coating compound may have a spherical shape (e.g., a generally spherical shape) or a sheet shape.

The positive active material may further include a conductive material together with the coating compound on the surface of the core. When the conductive material is positioned on the surface of the core, an ion conductive path may be substantially uniformly formed in an active material layer without using a separate conductive material during preparation of a positive active material composition for a positive electrode.

When the positive active material further includes the conductive material along with the coating compound on the surface of the core, the conductive material may be included in an amount of 1 part by weight to 2 parts by weight based on 100 parts by weight of the core. When the conductive material is included within the foregoing range, excellent rate capability, cycle-life characteristics, and capacity characteristics per volume may be obtained.

The lithium intercalation compound may be a compound represented by the following chemical formulae.

Li$_a$A$_{1-b}$X$_b$D$_2$ (0.90≤a≤1.8, 0≤b≤0.5); Li$_a$A$_{1-b}$X$_b$O$_{2-b}$D$_c$ (0.90≤a≤1.8, 0≤b≤0.5, 0≤c≤0.05); Li$_a$E$_{1-b}$X$_b$O$_{2-c}$D$_c$ (0≤b≤0.5, 0≤c≤0.05); Li$_a$E$_{2-b}$X$_b$O$_{4-c}$D$_c$ (0≤b≤0.5, 0≤c≤0.05); Li$_a$Ni$_{1-b-c}$Co$_b$X$_c$D$_\alpha$ (0.90≤a≤1.8, 0≤b≤0.5, 0≤c≤0.5, 0<α≤2); Li$_a$Ni$_{1-b-c}$Co$_b$X$_c$O$_{2-\alpha}$T$_\alpha$ (0.90≤a≤1.8, 0≤b≤0.5, 0≤c≤0.05, 0<α<2); Li$_a$Ni$_{1-b-c}$Co$_b$X$_c$O$_{2-\alpha}$T$_2$ (0.90≤a≤1.8, 0≤b≤0.5, 0≤c≤0.05, 0<α<2); Li$_a$Ni$_{1-b-c}$Mn$_b$X$_c$D$_\alpha$ (0.90≤a≤1.8, 0≤b≤0.5, 0≤c≤0.05, 0<α≤2); Li$_a$Ni$_{1-b-c}$Mn$_b$X$_c$O$_{2-\alpha}$T$_\alpha$ (0.90≤a≤1.8, 0≤b≤0.5, 0≤c≤0.05, $0<\alpha<2$); $Li_aNi_{1-b-c}Mn_bX_cO_{2-\alpha}T_2$ ($0.90\leq a\leq 1.8$, $0\leq b\leq 0.5$, $0\leq c\leq 0.05$, $0<\alpha<2$); $Li_aNi_bE_cG_dO_2$ ($0.90\leq a\leq 1.8$, $0\leq b\leq 0.9$, $0\leq c\leq 0.5$, $0.001\leq d\leq 0.1$); $Li_aNi_bCo_cMn_dG_eO_2$ ($0.90\leq a\leq 1.8$, $0\leq b\leq 0.9$, $0\leq c\leq 0.5$, $0\leq d\leq 0.5$, $0.001\leq e\leq 0.1$); $Li_aNiG_bO_2$ ($0.90\leq a\leq 1.8$, $0.001\leq b\leq 0.1$) $Li_aCoG_bO_2$ ($0.90\leq a\leq 1.8$, $0.001\leq b\leq 0.1$); $Li_aMn_{1-b}G_bO_2$ ($0.90\leq a\leq 1.8$, $0.001\leq b\leq 0.1$); $Li_aMn_2G_bO_4$ ($0.90\leq a\leq 1.8$, $0.001\leq b\leq 0.1$); $Li_aMn_{1-g}G_gPO_4$ ($0.90\leq a\leq 1.8$, $0\leq g\leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0\leq f\leq 2$); $Li_{(3-f)}Fe_2(PO_4)_3$ ($0\leq f\leq 2$); or $Li_aFePO_4$ ($0.90\leq a\leq 1.8$)

In the chemical formulae, A is selected from Ni, Co, Mn, and a combination thereof, M is selected from Mg, La, Tb, Gd, Ce, Pr, Nd, Sm, Ba, Sr, Ca, or a combination thereof, D is selected from O, F, S, P, and a combination thereof, E is selected from Co, Mn, and a combination thereof, and T is selected from F, S, P, and a combination thereof.

The positive active material may be prepared according to the following process.

A lithium intercalation compound is mixed with a coating compound. This coating compound may be a crystalline aluminum hydroxide, a crystalline aluminum oxyhydroxide, or a combination thereof.

The coating compound may be used in an amount of about 0.05 mol % to about 2 mol % or about 0.1 mol % to about 1 mol % based on 100 mol % of the lithium intercalation compound.

During the mixing process, a conductive material may be further used. When this conductive material is further used, the coating compound and the conductive material may be present together on the surface of the lithium intercalation compound. In addition, when the mixing process is a dry process, the conductive material may be well positioned on the surface of an active material and suppressed from being agglomerated itself (e.g., agglomeration of the conductive material may be reduced).

When the conductive material is further used, the conductive material may be used in an amount of about 1 part by weight to about 2 parts by weight based on 100 parts by weight of the lithium intercalation compound.

The mixing process may be, for example, a ball milling process as the dry process using no solvent. When the mixing process is performed as the dry process, the coating compound may be discontinuously present as an island form on the surface of the lithium intercalation compound.

When the mixing process is a wet process using a solvent, a crystalline coating compound may be difficult to effectively and substantially uniformly position on the surface of the core, and a dry process and a heat treatment process for removing the solvent may be additionally further required due to the undesired agglomeration of the coating compound itself or the core itself.

The mixing process may be performed at about 1000 rpm to about 2000 rpm for about 10 minutes to about 20 minutes. The mixing process may be performed by using a hansel mixer but is not limited thereto. When this mixing process is performed within the foregoing speed and time, the coating compound may be more appropriately or suitably positioned on the surface of the core and the mixing process may be performed without doing harm on the core (or substantially without harming the core), and thus a final product may have more excellent reliability and cycle-life characteristics.

An embodiment provides a rechargeable lithium battery including the positive electrode including a positive active material, a negative electrode including a negative active material, and an electrolyte.

The positive electrode may include a positive current collector and a positive active material layer formed on the positive current collector. The positive active material may be the positive active material according to the embodiment.

In the positive active material layer, a content of the positive active material may be about 90 wt % to about 98 wt % based on the total amount (weight) of the positive active material layer.

The positive active material layer includes a binder and a conductive material. Herein, the binder and the conductive material may be included in an amount of about 1 wt % to about 5 wt %, respectively based on the total amount (weight) of the positive active material layer.

The binder improves binding properties of positive active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material is included to provide electrode conductivity. Any suitable electrically conductive material may be used as a conductive material unless it causes an undesirable or unsuitable chemical change in the rechargeable lithium battery. Examples of the conductive material may be a carbon-based material such as natural graphite, artificial graphite, carbon black, acetylene black, ketjen black, denka black, a carbon fiber and the like; a metal-based material of a metal powder or a metal fiber including copper, nickel, aluminum, silver, and the like; a conductive polymer such as a polyphenylene derivative; or a mixture thereof.

The current collector may be Al, but the current collector is not limited thereto.

The negative electrode includes a current collector and a negative active material layer formed on the current collector, and the negative active material layer includes a negative active material.

The negative active material includes a material that reversibly intercalates/deintercalates lithium ions, a lithium metal, a lithium metal alloy, a material being capable of doping/dedoping lithium, and/or a transition metal oxide.

The material that can reversibly intercalate/deintercalate lithium ions includes a carbon material. The carbon material may be any suitable generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical (generally spherical), or fiber shaped natural graphite or artificial graphite. The amorphous carbon may be a soft carbon, a hard carbon, a mesophase pitch carbonization product, fired coke, and the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide includes vanadium oxide, lithium vanadium oxide, or lithium titanium oxide.

In the negative active material layer, the negative active material may be included in an amount of about 95 wt % to about 99 wt % based on the total weight of the negative active material layer.

The negative active material layer includes a binder, and optionally a conductive material. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used as a thickener in order to provide viscosity. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material is included to provide electrode conductivity. Any suitable electrically conductive material may be used as a conductive material unless it causes an undesirable or unsuitable chemical change in the rechargeable lithium battery. Examples of the conductive material include a carbon-based material such as natural graphite, artificial graphite, carbon black, acetylene black, ketjen black, denka black, a carbon fiber and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but the current collector is not limited thereto.

The negative electrode and the positive electrode may be respectively manufactured by mixing each active material, a conductive material and a binder in a solvent to prepare an active material composition, and coating the composition on a current collector. The electrode may be manufactured according to any suitable manufacturing method available in the art, and thus, the manufacturing method is not further described here. When the negative electrode uses the non-water-soluble binder, the solvent may be an organic solvent such as N-methylpyrrolidone, while when it uses the water-soluble binder, the solvent may be water.

The electrolyte includes an organic solvent and a lithium salt.

The organic solvent serves as a medium for transmitting ions taking part in the electrochemical reaction of a battery.

The organic solvent may include a carbonate-based, ester-based, ether-based, ketone-based, alcohol-based, or aprotic solvent. The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent includes cyclohexanone and the like. The alcohol-based solvent include ethyl alcohol, isopropyl alcohol, and the like, and examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used singularly or in a mixture. When the organic solvent is used in a mixture, the mixture ratio may be controlled in accordance with a desirable or suitable battery performance.

The carbonate-based solvent may include a mixture including a cyclic carbonate and a linear carbonate. The cyclic carbonate and linear carbonate are mixed together to a volume ratio of about 1:1 to about 1:9. When the mixture is used as an electrolyte, it may have enhanced performance.

The organic solvent may further include an aromatic hydrocarbon-based solvent as well as the carbonate-based solvent. The carbonate-based solvent and aromatic hydrocarbon-based solvent may be mixed together to a volume ratio of about 1:1 to about 30:1.

The aromatic hydrocarbon-based organic solvent may be an aromatic hydrocarbon-based compound represented by Chemical Formula 1.

Chemical Formula 1

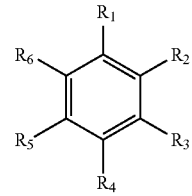

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 2, or propanesultone to improve cycle life.

Chemical Formula 2

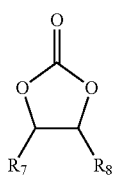

In Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate or suitable range.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). The lithium salt may be used in a concentration in a range of about 0.1 M to about 2.0 M. When the lithium salt is included at the above concentration range, an electrolyte may have excellent performance and lithium ion mobility due to suitable or optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The rechargeable lithium battery may be classified into a lithium ion battery, a lithium ion polymer battery, and a lithium polymer battery depending on kinds of a separator and an electrolyte. It also may be classified to be cylindrical, prismatic, coin-type (or kind), pouch-type (or kind), and the like depending on a shape. In addition, it may be bulk type (or kind) and thin film type (or kind) depending on sizes. The lithium ion batteries of embodiments of the present disclosure may have any suitable structure and may be prepared according to any suitable manufacturing method available in the art.

FIG. 1 is an exploded perspective view of a rechargeable lithium battery according to an embodiment. The rechargeable lithium battery according to an embodiment is illustrated as a prismatic battery but is not limited thereto and may include variously-shaped suitable batteries such as a cylindrical battery, a pouch battery, and the like.

Referring to FIG. 1, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

Hereinafter, examples of embodiments of the present disclosure and comparative examples are described. These examples, however, are not in any sense to be interpreted as limiting the scope of the invention.

Example 1

$Li_2CO_3$ and $Co_3O_4$ were mixed to have a Li:Co ratio of 1:1. This mixture was heat-treated at 1000° C. for 20 hours under an air atmosphere (50 lb/min) and pulverized to prepare $LiCoO_2$.

The obtained $LiCoO_2$ and crystalline $Al(OH)_3$ were weighed to a ratio of 100 mol %:0.1 mol % and mixed with a hansel mixer at 1000 rpm for 20 minutes. Through this process, a positive active material having $Al(OH)_3$ present as an island form on the surface of the $LiCoO_2$ was prepared. In addition, the positive active material included the crystalline $Al(OH)_3$ in an amount of about 0.1 mol % based on 100 mol % of the positive active material.

96 wt % of the positive active material, 2 wt % of a polyvinylidene fluoride binder, and 2 wt % of a denka black conductive material were mixed in an N-methyl pyrrolidone solvent to prepare a positive active material slurry.

The positive active material slurry was coated on an Al foil and then, dried and compressed to manufacture a positive electrode.

The positive electrode was used together with a lithium metal counter electrode and an electrolyte solution to manufacture a half-cell through a general process. Herein, the electrolyte solution was prepared by mixing ethylene carbonate, ethylmethyl carbonate and dimethyl carbonate to a volume ratio of 3:3:4 to obtain an organic solvent and dissolving 1.15 M $LiPF_6$ (a lithium salt) therein.

Example 2

A half-cell was manufactured according to substantially the same method as described with respect to Example 1 except for preparing a positive active material by mixing the $LiCoO_2$ and the crystalline $Al(OH)_3$ to a ratio of 100 mol %:0.15 mol %. In addition, the positive active material included the crystalline Al(OH)$_3$ in an amount of about 0.15 mol % based on 100 mol % of the positive active material.

Example 3

A half-cell was manufactured according to substantially the same method as described with respect to Example 1 except for preparing a positive active material by mixing the LiCoO$_2$ and the crystalline Al(OH)$_3$ to a ratio of 100 mol %:0.2 mol %. In addition, the positive active material included the crystalline Al(OH)$_3$ in an amount of about 0.2 mol % based on 100 mol % of the positive active material.

Example 4

A half-cell was manufactured according to substantially the same method as described with respect to Example 1 except for preparing a positive active material by mixing the LiCoO$_2$ and the crystalline Al(OH)$_3$ to a ratio of 100 mol %:0.3 mol %. In addition, the positive active material included the crystalline Al(OH)$_3$ in an amount of about 0.3 mol % based on 100 mol % of the positive active material.

Example 5

A half-cell was manufactured according to substantially the same method as described with respect to Example 1 except for preparing a positive active material by mixing the LiCoO$_2$ and the crystalline Al(OH)$_3$ to a ratio of 100 mol %:0.5 mol %. In addition, the positive active material included the crystalline Al(OH)$_3$ in an amount of about 0.5 mol % based on 100 mol % of the positive active material.

Example 6

A half-cell was manufactured according to substantially the same method as described with respect to Example 1 except for preparing a positive active material by mixing the LiCoO$_2$ and the crystalline Al(OH)$_3$ to a ratio of 100 mol %:1.0 mol %. In addition, the positive active material included the crystalline Al(OH)$_3$ in an amount of about 1.0 mol % based on 100 mol % of the positive active material.

Example 7

A half-cell was manufactured according to substantially the same method as described with respect to Example 1 except for preparing a positive active material by mixing the LiCoO$_2$ and the crystalline Al(OH)$_3$ to a ratio of 100 mol %:2.0 mol %. In addition, the positive active material included the crystalline Al(OH)$_3$ in an amount of about 2.0 mol % based on 100 mol % of the positive active material.

Reference Example 1

A half-cell was manufactured according to substantially the same method as described with respect to Example 1 except for preparing a positive active material by mixing the LiCoO$_2$ and the crystalline Al(OH)$_3$ to a ratio of 100 mol %:3.0 mol %.

Reference Example 2

A half-cell was manufactured according to substantially the same method as described with respect to Example 1 except for preparing a positive active material by mixing the LiCoO$_2$ and the crystalline Al(OH)$_3$ to a ratio of 100 mol %:5.0 mol %.

Comparative Example 1

A half-cell was manufactured according to substantially the same method as described with respect to Example 1 except for using the LiCoO$_2$ prepared in Example 1, prior to mixing with crystalline Al(OH)$_3$ (i.e., without the crystalline Al(OH)$_3$ coating), as a positive active material.

Comparative Example 2

A half-cell was manufactured according to substantially the same method as described with respect to Example 1 except for preparing a positive active material by using amorphous Al(OH)$_3$ instead of the crystalline Al(OH)$_3$ and mixing the LiCoO$_2$ and the amorphous Al(OH)$_3$ to a ratio of 100 mol %:0.5 mol %. In addition, the positive active material included the amorphous Al(OH)$_3$ in an amount of about 0.5 mol % based on 100 mol % of the positive active material.

The positive active material used was prepared as described with respect to Example 1 to manufacture a half-cell.

Comparative Example 3

A positive active material was prepared according to substantially the same method as described with respect to Example 1 except for preparing a positive active material by mixing the LiCoO$_2$ and the amorphous Al(OH)$_3$ in a ratio of 100 mol %:0.1 mol % and then, used to manufacture a half-cell according to substantially the same method as described with respect to Comparative Example 1. In addition, the positive active material included the amorphous Al(OH)$_3$ in an amount of about 0.1 mol % based on 100 mol % of the positive active material.

Comparative Example 4

A positive active material was prepared according to substantially the same method as described with respect to Example 1 except for preparing a positive active material by mixing the LiCoO$_2$ and the amorphous Al(OH)$_3$ to a ratio of 100 mol %:0.2 mol % and then, used to manufacture a half-cell according to substantially the same method as described with respect to Comparative Example 1. In addition, the positive active material included the amorphous Al(OH)$_3$ in an amount of about 0.2 mol % based on 100 mol % of the positive active material.

Comparative Example 5

A positive active material was prepared according to substantially the same method as described with respect to Example 1 except for preparing a positive active material by mixing the LiCoO$_2$ and the amorphous Al(OH)$_3$ to a ratio of 100 mol %:0.3 mol % and then, used to manufacture a half-cell according to substantially the same method as described with respect to Comparative Example 1. In addition, the positive active material included the amorphous Al(OH)$_3$ in an amount of about 0.3 mol % based on 100 mol % of the positive active material.

SEM Image and EDS Mapping Image

Figure 2A:
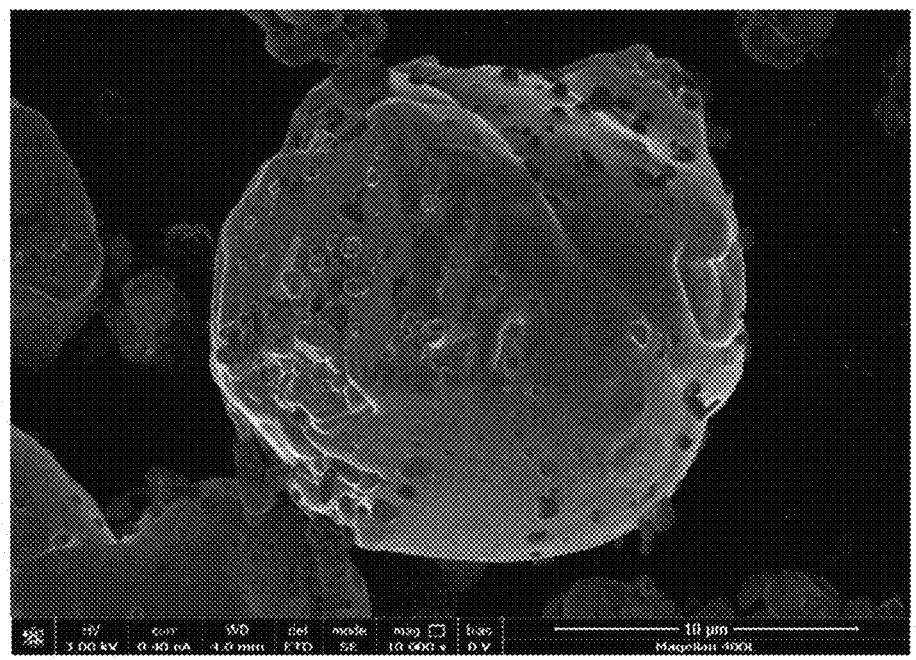
FIG. 2A is a 10,000× magnification SEM (Scanning Electron Microscope) image showing a positive active material according to Example 1.
Figure 2B:
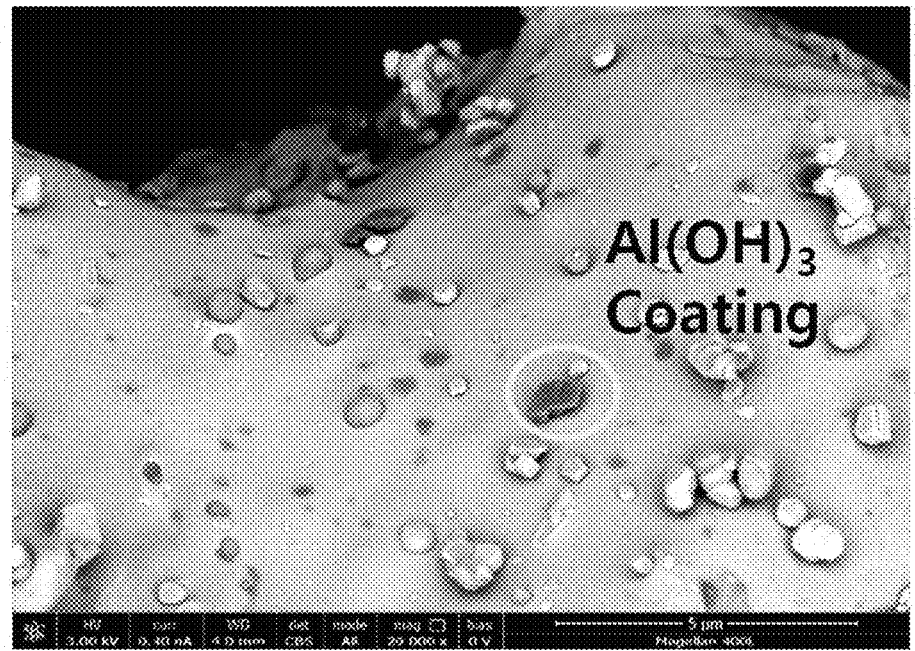
FIG. 2B is a 20,000× magnification SEM image showing the positive active material according to Example 1.
Figure 2C:
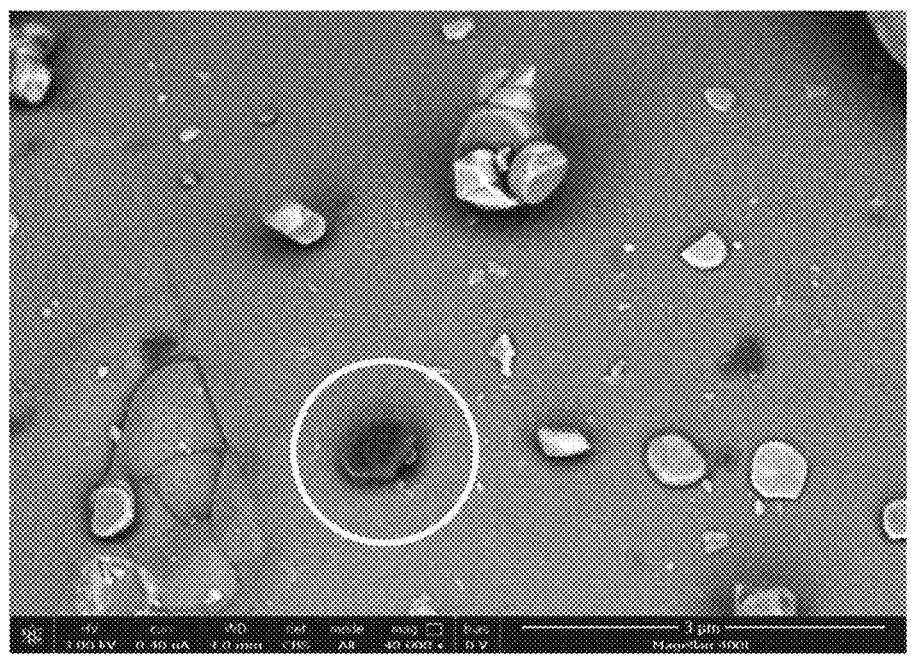
FIG. 2C is a 40,000× magnification SEM image showing the positive active material according to Example 1.

FIG. 2A shows a 10,000× magnification SEM image showing the surface of the positive active material according to Example 1, and FIGS. 2B-2C, respectively, show that 20,000× magnification and 40,000× magnification SEM images thereof. A region marked with a respective circle in FIGS. 2B-2C denotes the $Al(OH)_3$, and the $Al(OH)_3$ is present as a discontinuous island form on the surface.

Figure 3:
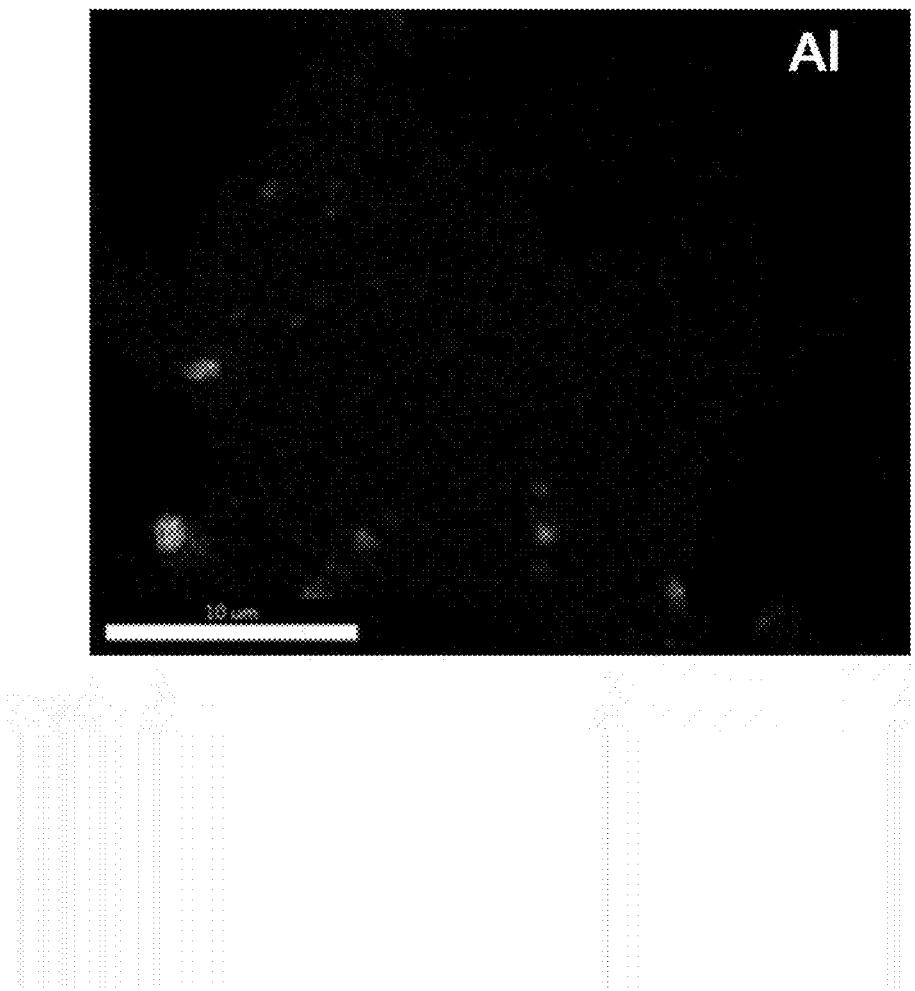
FIG. 3 is an EDS (Energy Dispersive X-ray Spectroscopy) mapping image showing the positive active material according to Example 1.

In addition, FIG. 3 is an EDS mapping of the positive active material according to Example 1. In FIG. 3, a bright region denotes the $Al(OH)_3$, wherein the $Al(OH)_3$ was present as a discontinuous island form on the surface.

STEM (Scanning Transmission Electron Microscopy) Analysis

Figure 4:
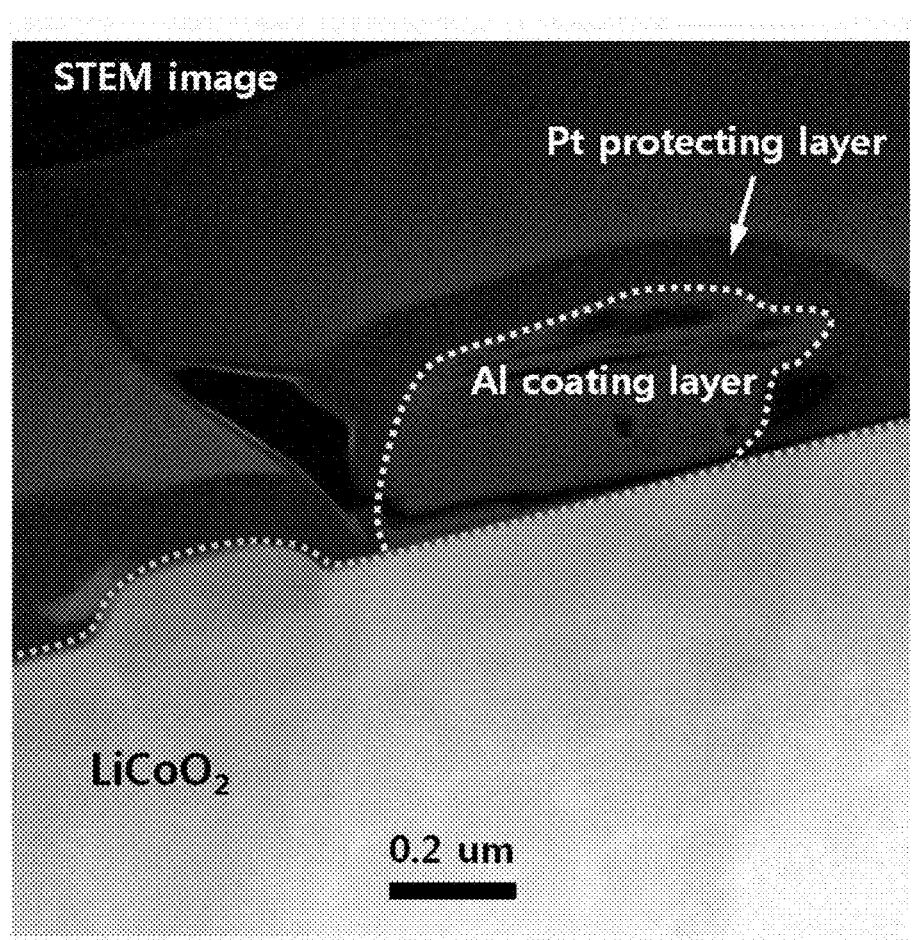
FIG. 4 is an STEM (Scanning Transmission Electron Microscopy) image showing the positive active material according to Example 1.

FIG. 4 is a STEM image showing the positive active material according to Example 1. In FIG. 4, an Al coating layer denotes $Al(OH)_3$, that is, a coating compound, and as shown in FIG. 4, the $Al(OH)_3$ was present as an island form (e.g., present as a plurality of discrete and discontiguous portions comprising $Al(OH)_3$). In FIG. 4, a Pt protecting layer was used to manufacture a specimen for a STEM measurement.

Figure 5A:
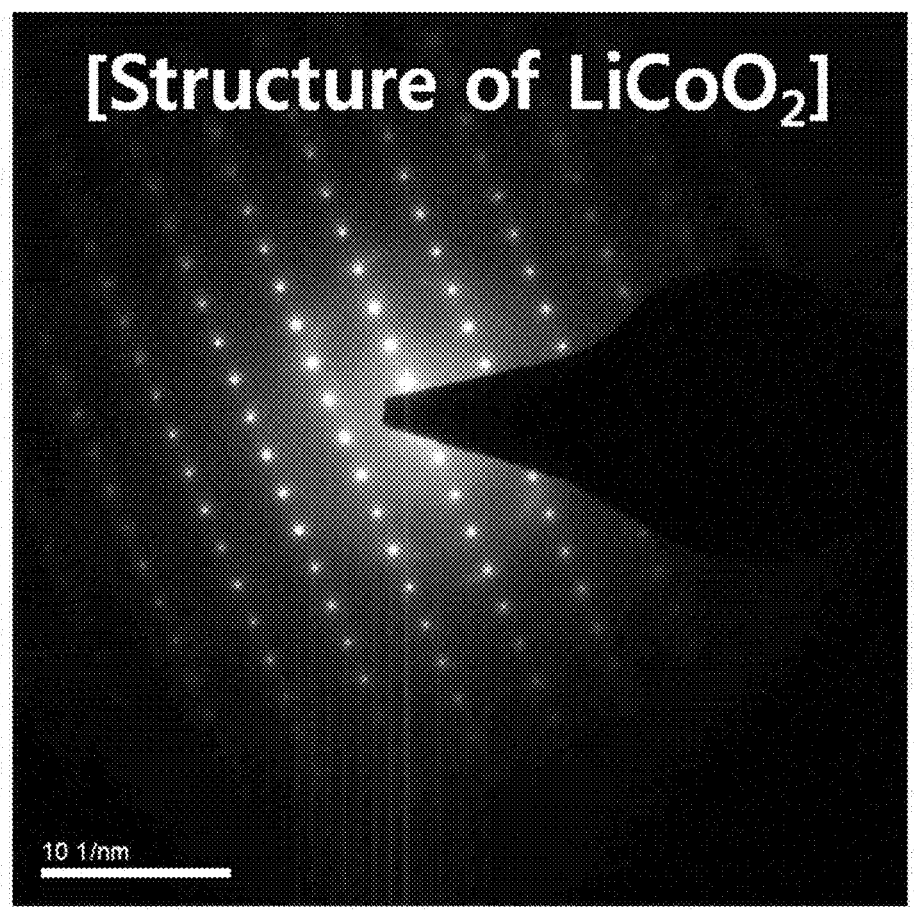
FIG. 5A is a SAD (Selected Area Diffraction) image showing $LiCoO_2$ in the positive active material of FIG. 4.
Figure 5B:
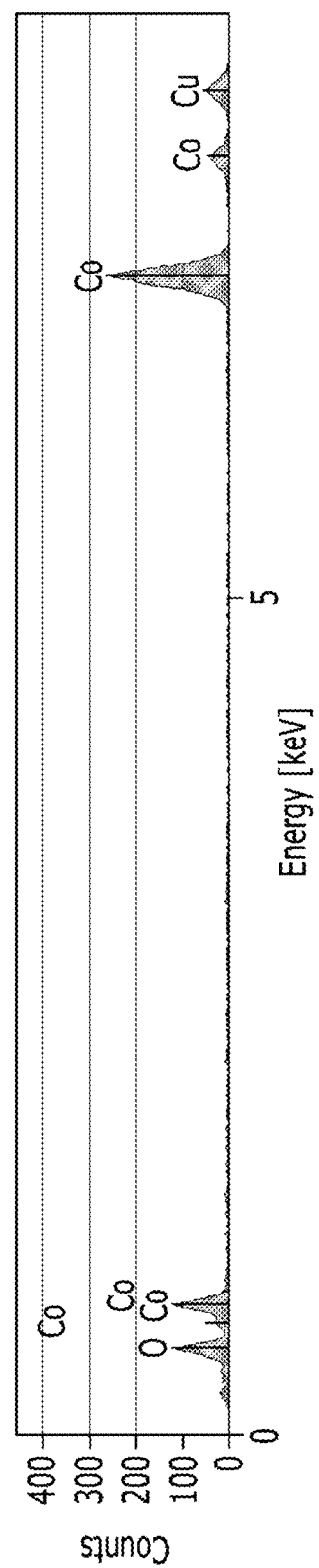
FIG. 5B is an EDX graph showing the $LiCoO_2$ in the positive active material of FIG. 4.

In addition, FIG. 5A is a Selected Area Diffraction (SAD) image showing a core of $LiCoO_2$ in FIG. 4, and FIG. 5B is its EDX graph. Referring to FIG. 5A, the core internally had no structural change (or substantially no structural change) after the coating process, and FIG. 5B shows that the core included no Al, but Co was present in the core.

Figure 6A:
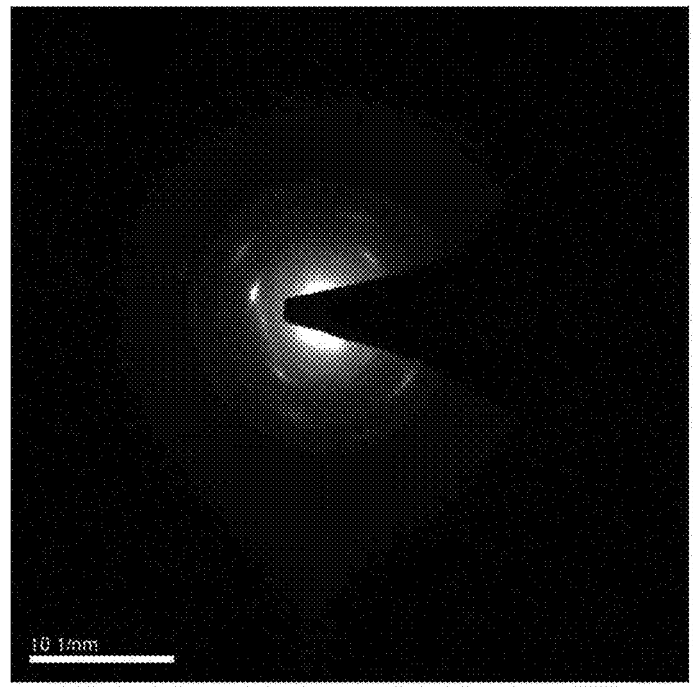
FIG. 6A is a SAD image showing a coating compound in the positive active material of FIG. 4.
Figure 6B:
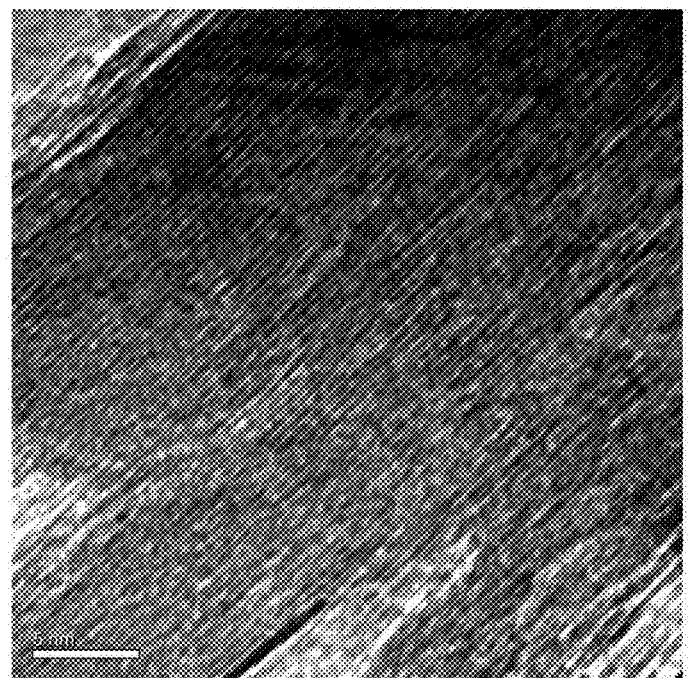
FIG. 6B is a HRTEM (High Resolution Transmission Electron Microscopy) image at 3,000,000× magnification (or enlarging) of a coating compound in the positive active material of FIG. 4.
Figure 6C:
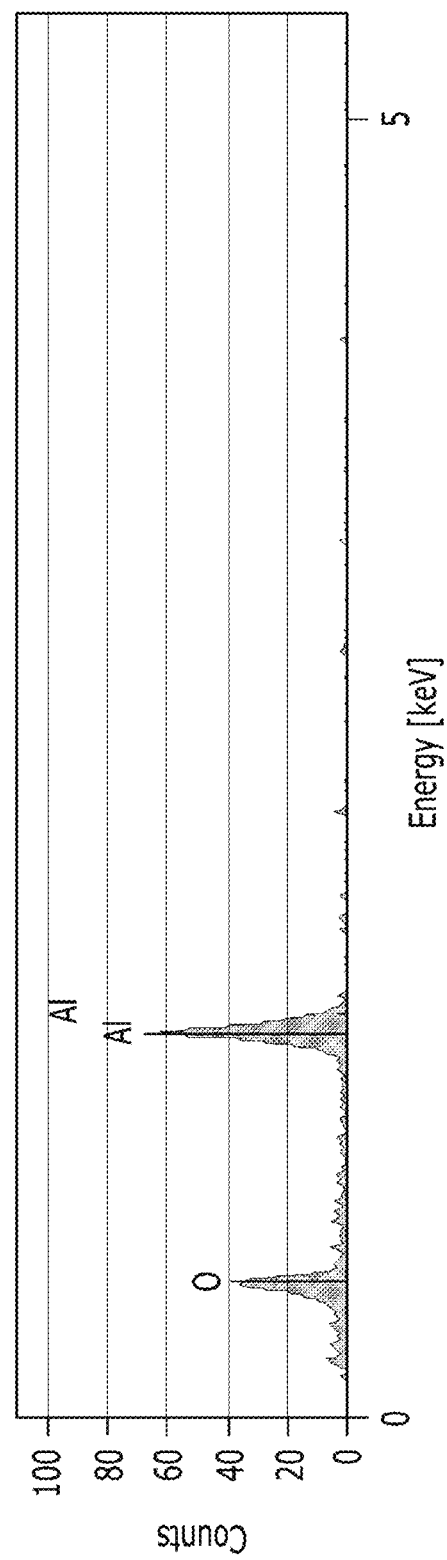
FIG. 6C is an EDX graph showing the coating compound in the positive active material of FIG. 4.

In addition, FIG. 6A is a SAD image showing the Al coating layer, that is, a coating compound in FIG. 4, FIG. 6B is a HRTEM image at 3,000,000× magnification (or enlarging) of the SAD image, and FIG. 6C is its EDX graph. The result of FIG. 6A shows that the coating compound was crystalline $Al(OH)_3$, and the compound was crystalline as can be seen from the lattice fringe of FIG. 6B. In addition, as shown in FIG. 6C, the coating compound included Al.

Figure 7A:
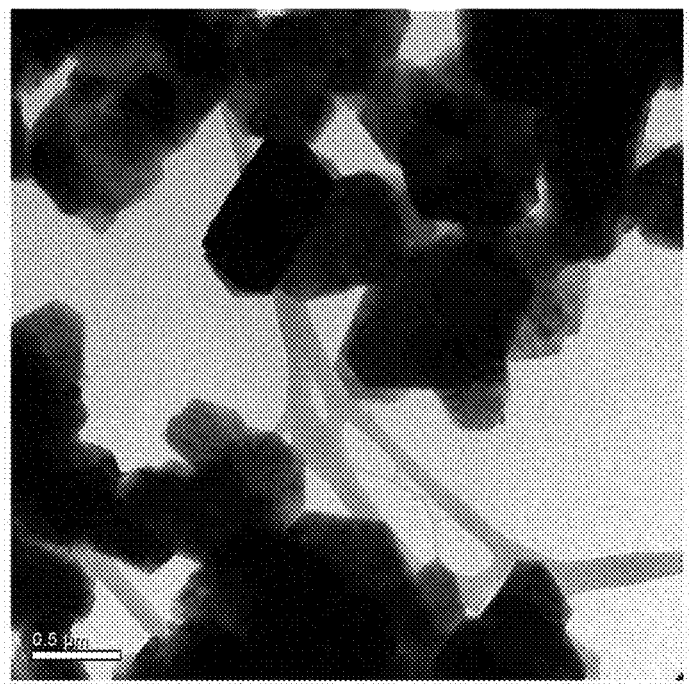
FIG. 7A is a SEM image showing a crystalline Al hydroxide used in Example 1.
Figure 7B:
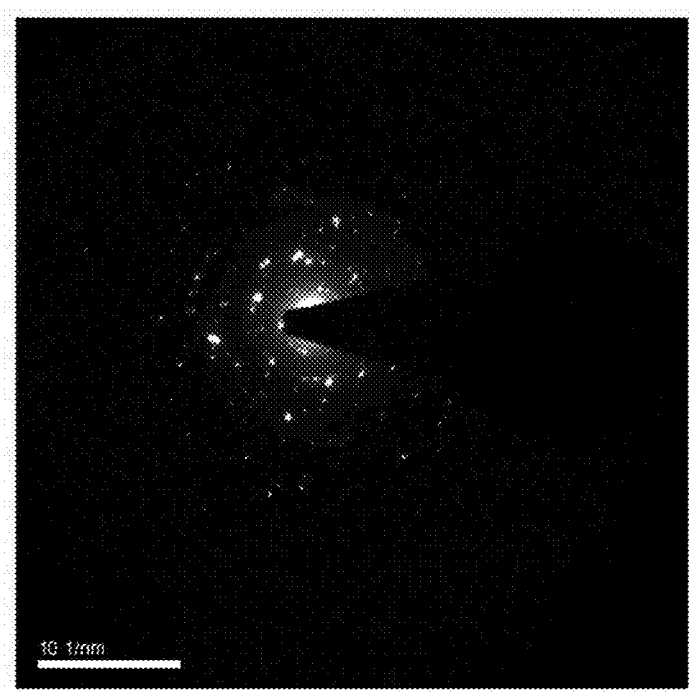
FIG. 7B is a SAD image showing the crystalline Al hydroxide used in Example 1.
Figure 7C:
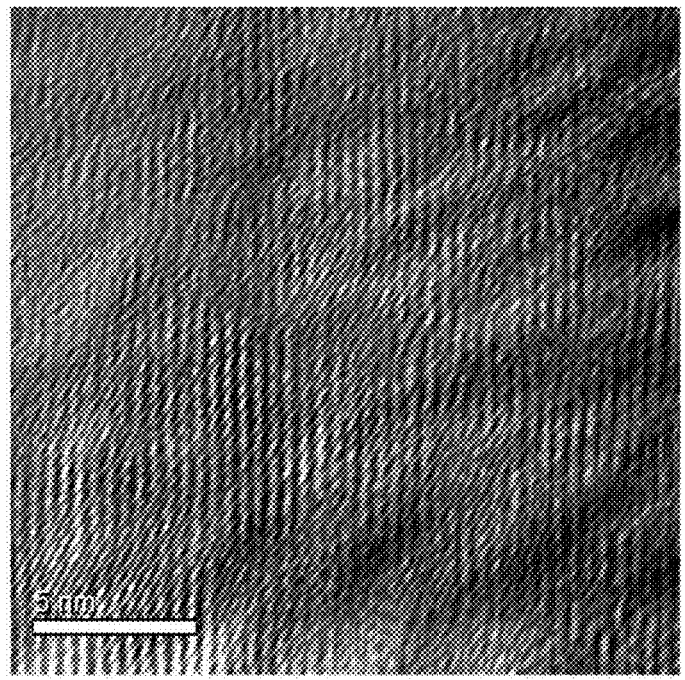
FIG. 7C is a HRTEM image showing the crystalline Al hydroxide of Example 1.
Figure 7D:
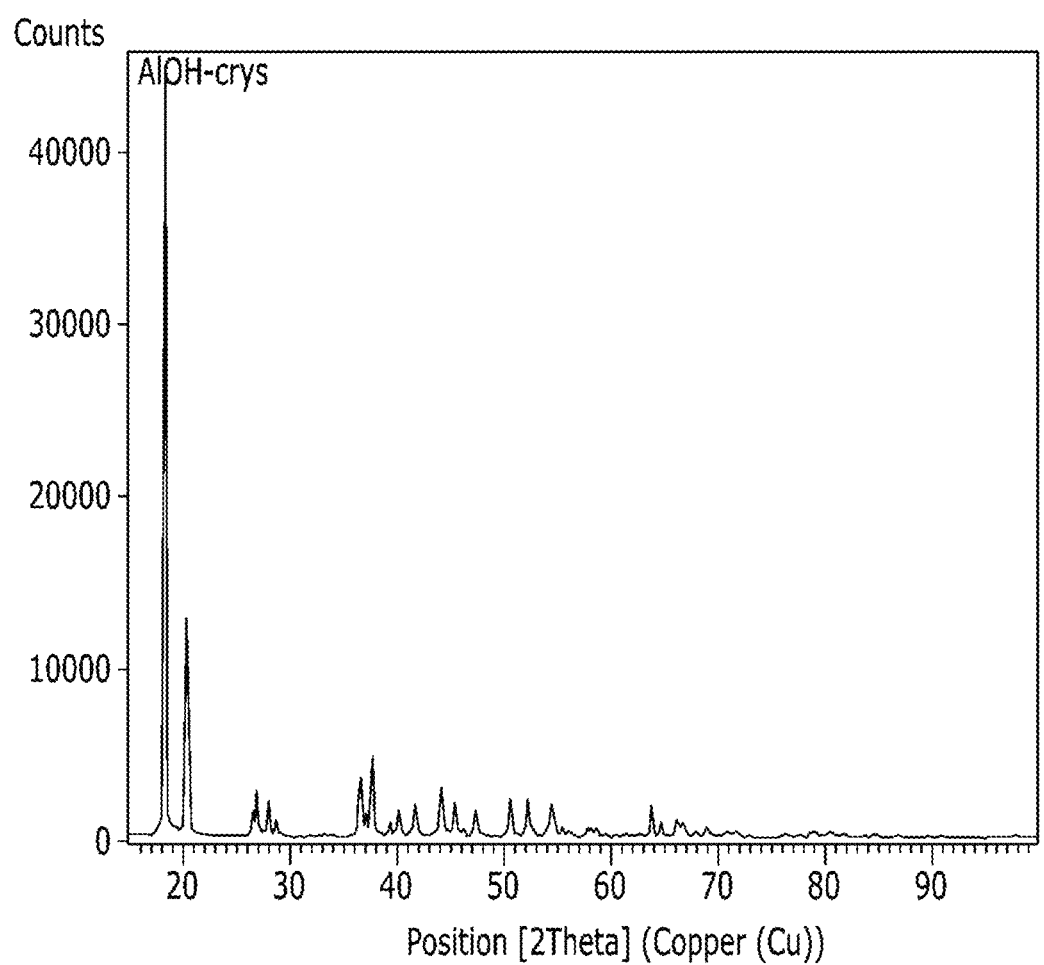
FIG. 7D is an EDX image showing the crystalline Al hydroxide of Example 1.

Furthermore, FIG. 7A is a STEM image showing the $Al(OH)_3$ according to Example 1, FIG. 7B is its SAD image, FIG. 7C is its HRTEM image, and FIG. 7D is its EDX graph.

The result of FIG. 7A shows that the $Al(OH)_3$ particle had a sheet shape and a size in a range of 200 nm to 500 nm, and the result of FIG. 7B result shows that the $Al(OH)_3$ was crystalline. In addition, the results of FIGS. 7C and 7D show that the $Al(OH)_3$ was crystalline.

Figure 8A:
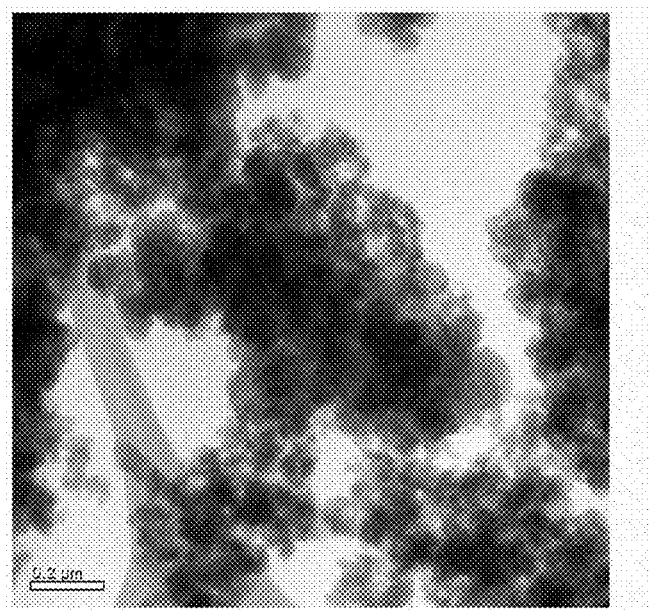
FIG. 8A is a STEM image showing a coating layer formed in a positive active material according to Comparative Example 2.
Figure 8B:
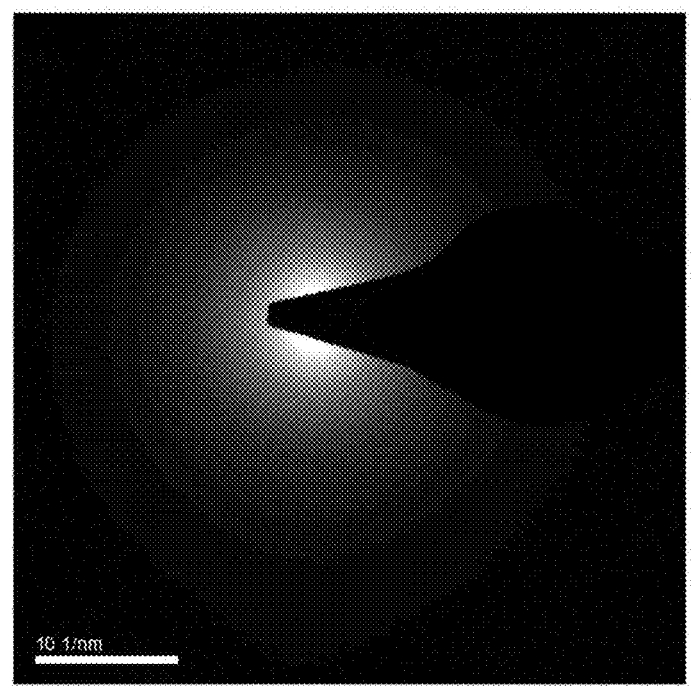
FIG. 8B is a SAD image showing the coating layer formed in the positive active material according to Comparative Example 2.
Figure 8C:
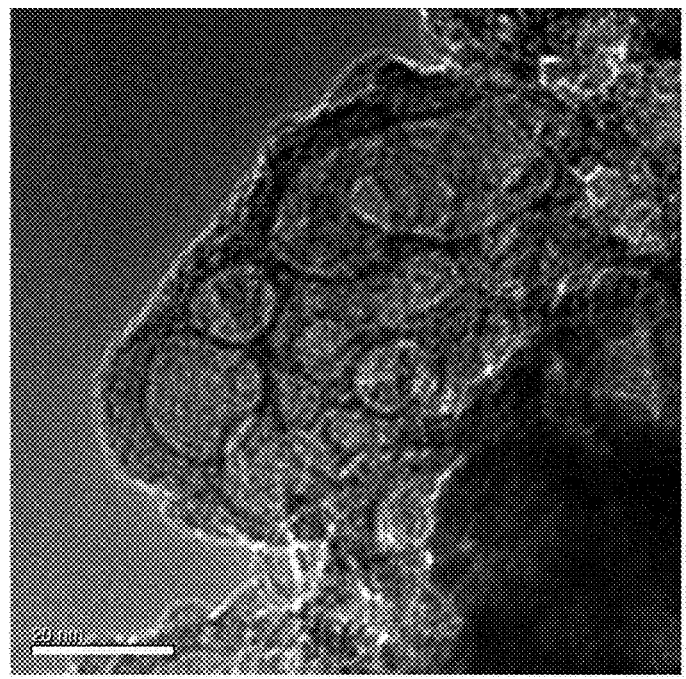
FIG. 8C is a HRTEM image showing the coating layer formed in the positive active material according to Comparative Example 2.
Figure 8D:
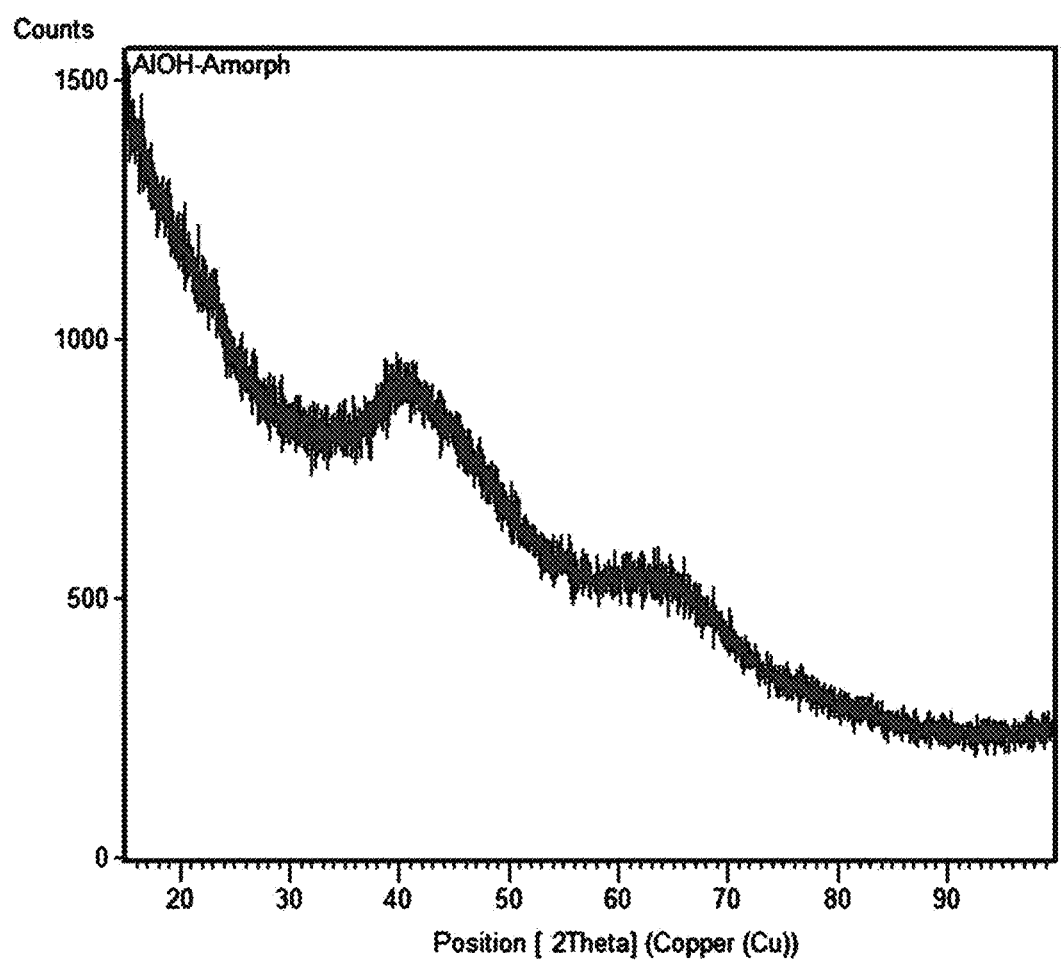
FIG. 8D is an EDX graph showing the coating layer formed in the positive active material according to Comparative Example 2.

Furthermore, FIG. 8A is a STEM image showing a coating layer on the surface of the positive active material of Comparative Example 2, FIG. 8B is its SAD image, FIG. 8C is its HRTEM image, and FIG. 8D is its EDX graph.

The results of FIGS. 8A-8B show that the coating layer was amorphous. In addition, the results of FIGS. 8C-8D show that the $Al(OH)_3$ was amorphous.

Moisture Adsorptivity

The moisture amounts included in the positive active materials according to Example 1 and the Comparative Example 2 were measured and then, re-measured after having been allowed to stand for 3 days in the air, and the results are provided in Table 1.

TABLE 1

|  | Comparative Example 1 | Comparative Example 2 | Example 1 |
|---|---|---|---|
| 0 day (before storage) | 0.005 wt % | 0.013 wt % | 0.005 wt % |
| After 3 days | 0.005 wt % | 0.032 wt % | 0.005 wt % |

As shown in Table 1, the positive active material including a crystalline coating compound according to Example 1 maintained equivalent adsorptivity to the positive active material in which a coating compound was not formed according to Comparative Example 1. On the contrary, the positive active material including an amorphous coating compound according to Comparative Example 1 showed very increased moisture adsorptivity.

Pellet Density 3 g of each positive active material according to Comparative Examples 1, 3, and 5 and Examples 1, 3, and 4 was put in a mold of a diameter of 6.5 pai (ø) and then, compressed using a pressure of 3 tons and maintained for 30 seconds to manufacture a pellet. Thickness of the pellet was measured and used together with the weight to calculate pellet density of the powder, and the results are provided in Table 2.

TABLE 2

|  | Content of coating compound (mol %) | Pellet density (g/cc) |
|---|---|---|
| Comparative Example 1 | 0 | 3.97 |
| Example 1 | 0.1 | 3.96 |
| Comparative Example 3 | 0.1 | 3.94 |
| Example 3 | 0.2 | 3.95 |
| Comparative Example 4 | 0.2 | 3.92 |
| Example 4 | 0.3 | 3.94 |
| Comparative Example 5 | 0.3 | 3.88 |

As shown in Table 2, the positive active materials coated with a crystalline coating compound according to Examples 1, 3, and 4 exhibited higher pellet density despite the presence of substantially the same amount of the coating compound than the positive active materials coated with an amorphous coating compound according to Comparative Examples 3 to 5. Accordingly, the positive active materials according to Examples 1, 3, and 4 may be expected to provide a high energy density battery.

SEM Image

Figure 9A:
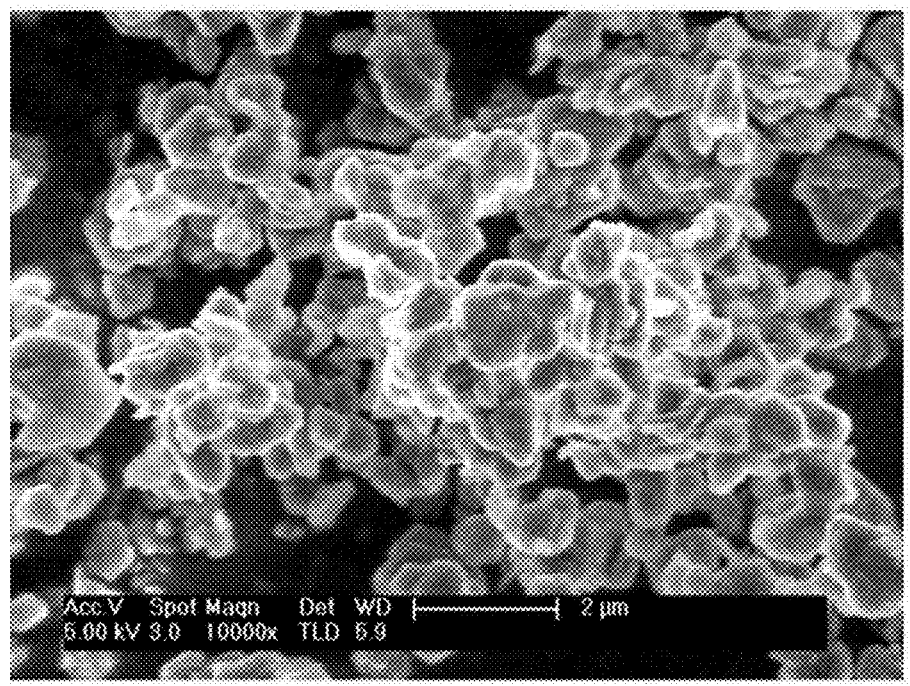
FIGS. 9A-9B are SEM images showing the crystalline $Al(OH)_3$ of Example 1.
Figure 9B:
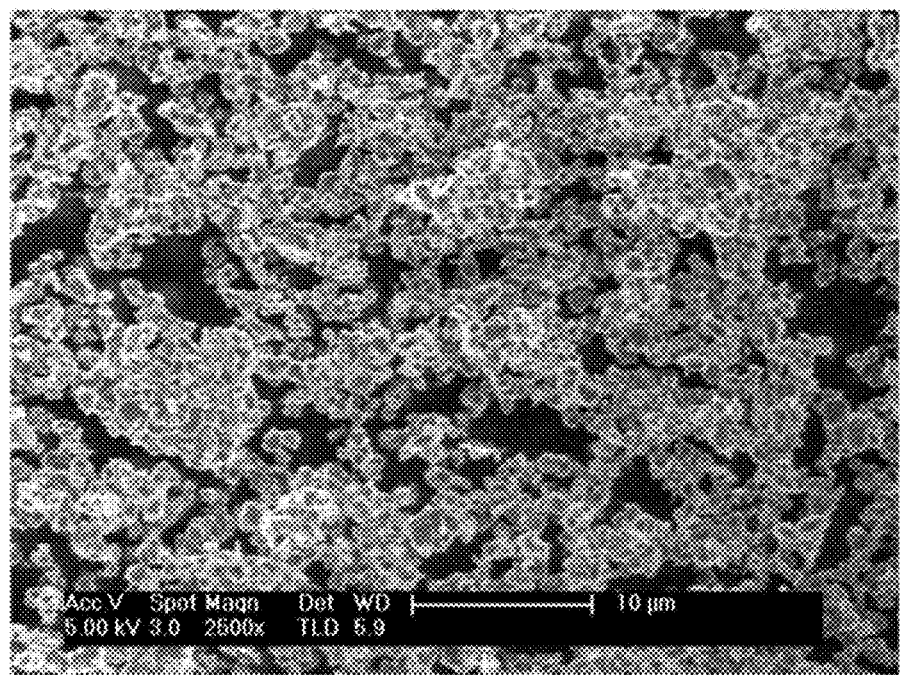
Figure 10A:
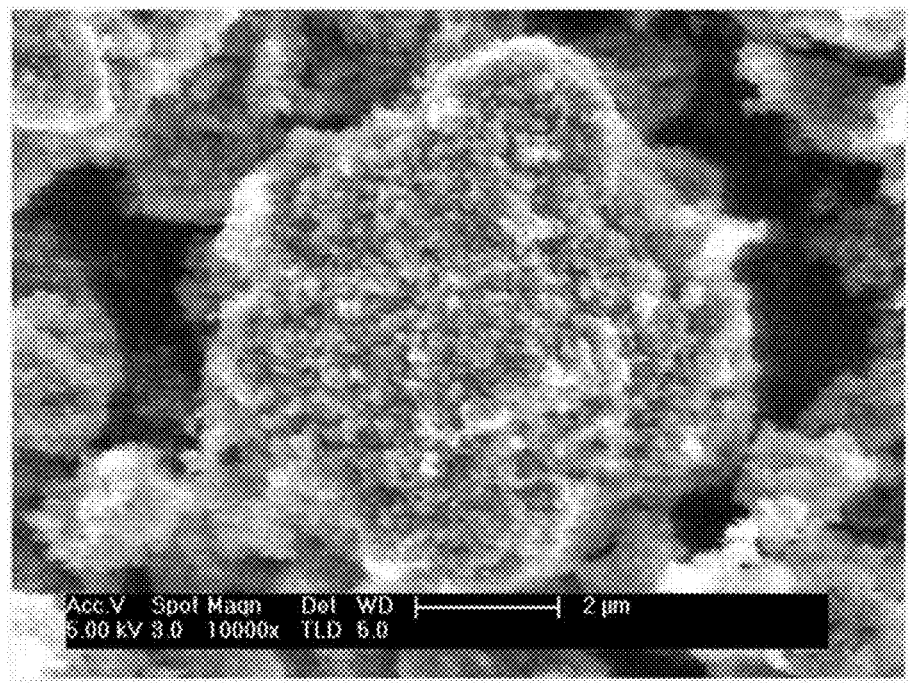
FIGS. 10A-10B are SEM images showing amorphous Al(OH)$_3$ of Comparative Example 2.
Figure 10B:
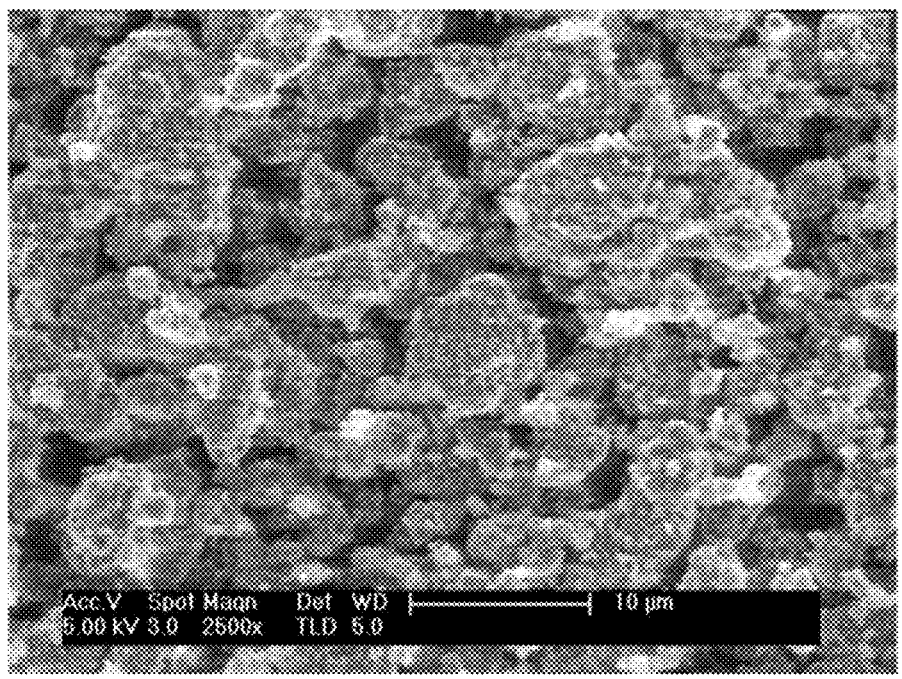

The SEM image of the crystalline $Al(OH)_3$ according to Example 1 is provided in FIG. 9A (10,000× magnification) and FIG. 9B (2,500× magnification), and the SEM image of the amorphous $Al(OH)_3$ according to Comparative Example 2 is provided in FIG. 10A (10,000× magnification) and FIG. 10B (2,500× magnification).

Cycle-Life Characteristics

Figure 11:
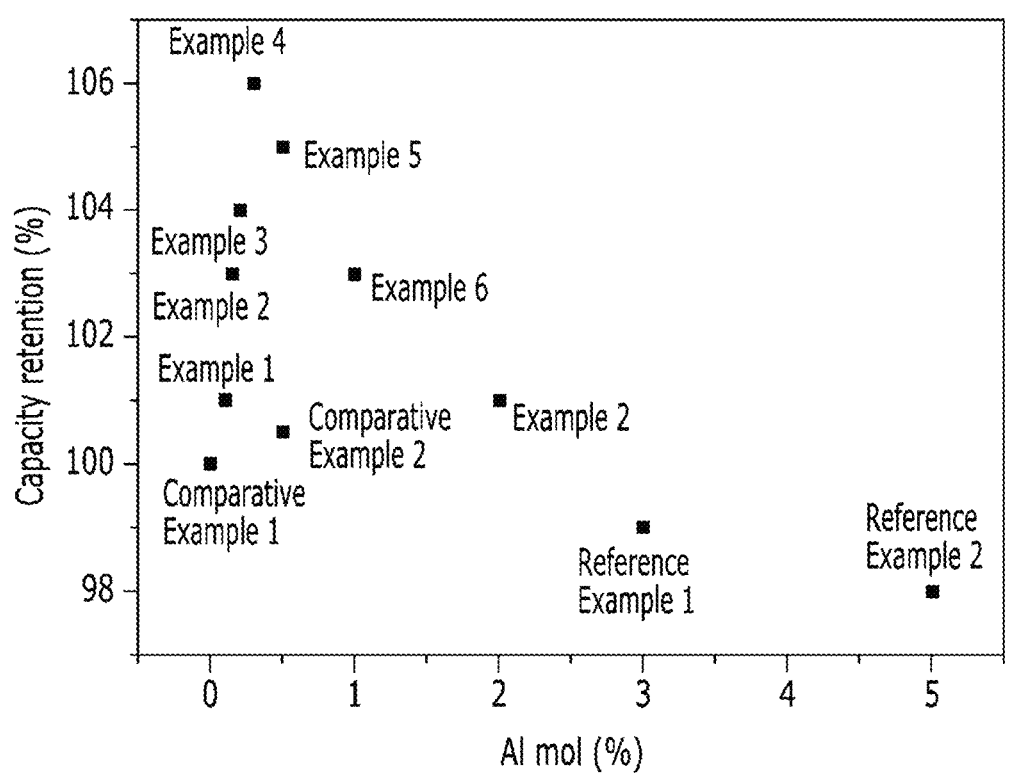
FIG. 11 is a graph showing cycle-life characteristics of cells according to Examples 1 to 7, Comparative Examples 1 and 2, and Reference Examples 1 and 2.

The half-cells according to Examples 1 to 7, Comparative Examples 1 and 2, and Reference Examples 1 to 2 were respectively 50 times charged at 1.0 C, and their discharge capacities were measured. Each discharge capacity of the other half-cells relative to 100% of discharge capacity of the half-cell of Comparative Example 1 was calculated, and the results are shown as a capacity retention in FIG. 11. As shown in FIG. 11, the cells using a positive active material coated with 0.5 mol % to 2 mol % of crystalline $Al(OH)_3$ according to Examples 1 to 7 exhibited excellent capacity retention compared with the one according to Comparative Example 1. On the contrary, the cells using a positive active material coated with an excessive amount of crystalline $Al(OH)_3$ within a range of 3 mol % and 5 mol % according to Reference Examples 1 and 2 exhibited rather deteriorated capacity retention compared with the cell according to Comparative Example 1. In addition, the cell using a positive active material coated with amorphous $Al(OH)_3$ according to Comparative Example 2 exhibited excellent capacity retention compared with the cell of Comparative Example 1 but lower capacity retention than the cells of Examples 1 to 7.

Figure 12:
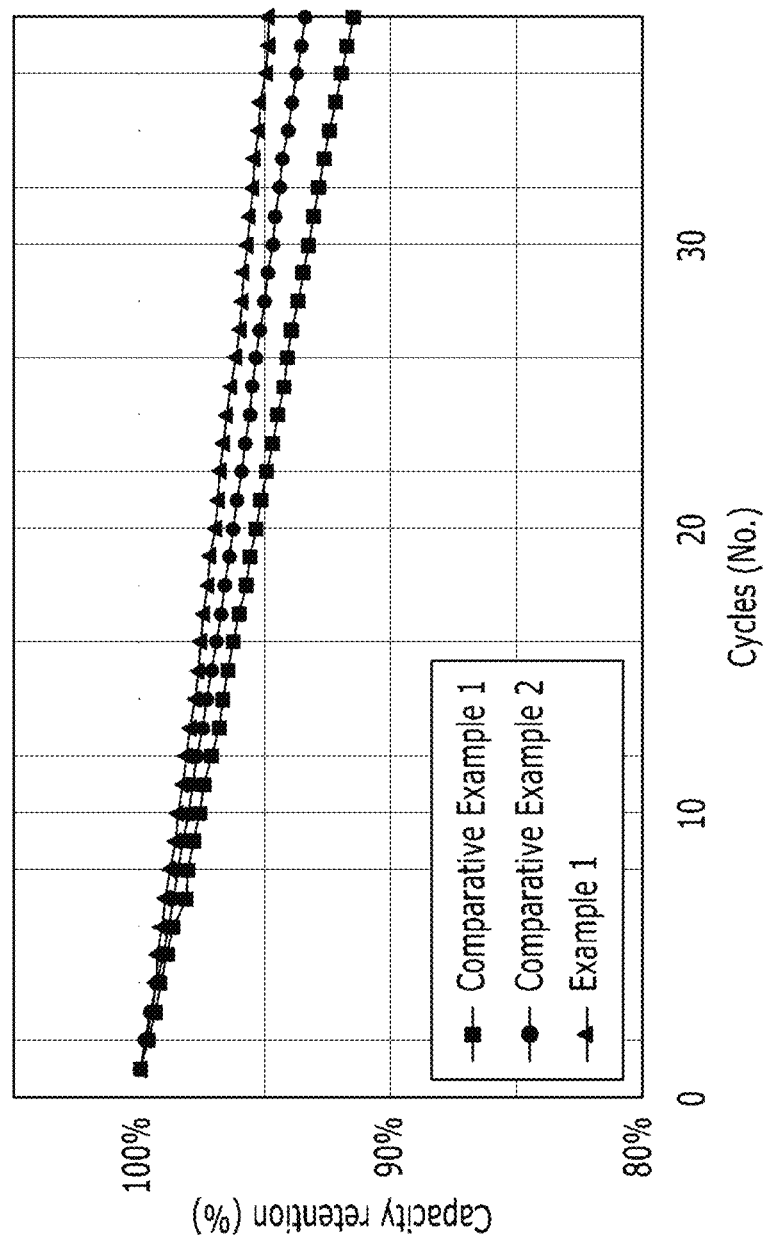
FIG. 12 is a graph showing cycle-life characteristics of the cells according to Example 1 and Comparative Examples 1 and 2.

In addition, the cells according to Example 1 and Comparative Examples 1 to 2 were 40 times 1 C charged and 1 C discharged in a constant current mode at 25° C., and then, a discharge capacity ratio at each cycle relative to the first discharge capacity was calculated as a capacity retention, and the results are shown in FIG. 12. As shown in FIG. 12, Example 1 using a positive active material coated with crystalline $Al(OH)_3$ exhibited excellent capacity retention compared with Comparative Example 2 using a positive active material coated with amorphous $Al(OH)_3$ or Comparative Example 1 using a positive active material having no coating.

Storage Characteristics at High Temperature

Figure 13:
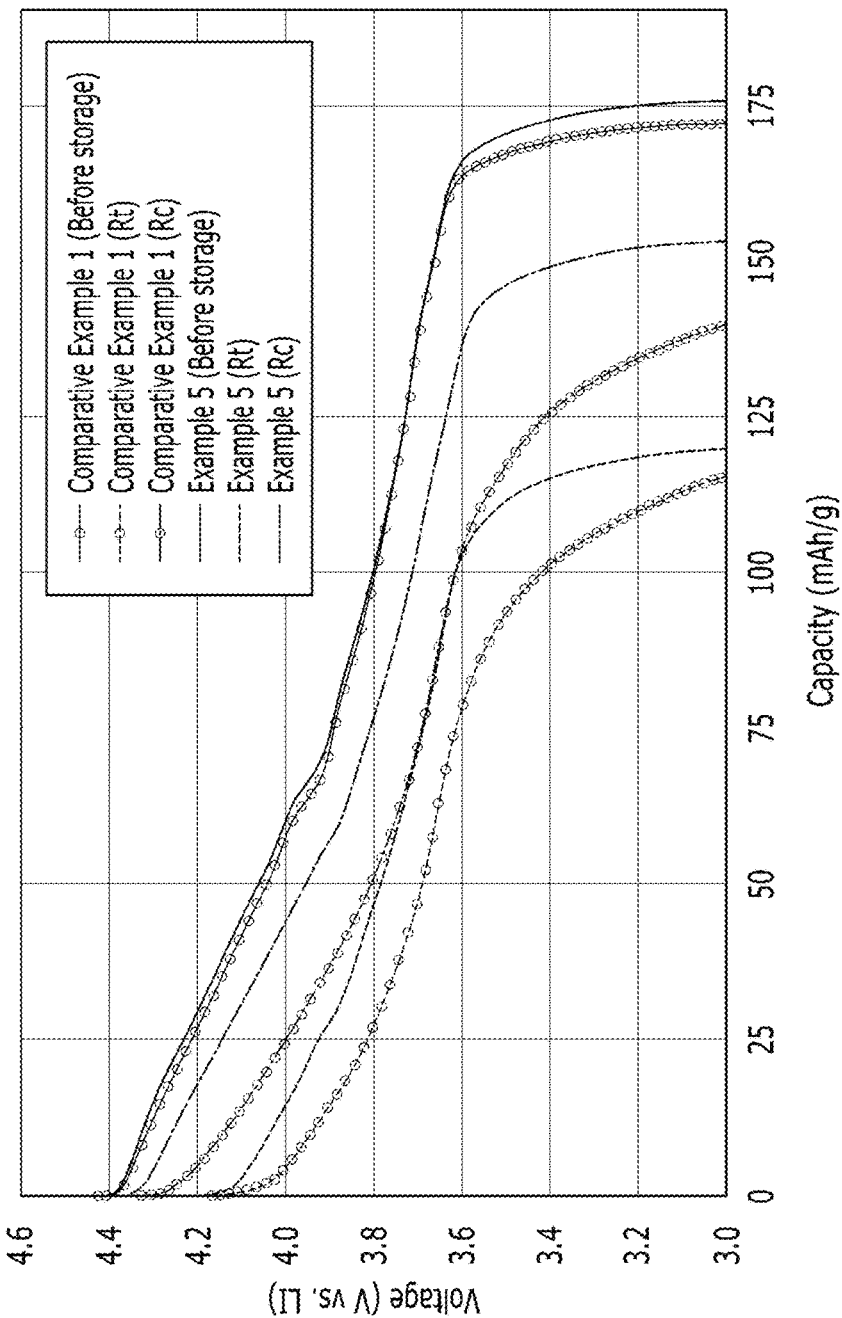
FIG. 13 is a graph showing storage characteristics of the cells according to Example 5 and Comparative Examples 1 and 2 at a high temperature.

The cells according to Example 5 and Comparative Examples 1 to 2 were stored at 60° C. for 7 days, and their charge and discharge characteristics before and after the storage were measured and shown in FIG. 13. In FIG. 13, (before storage) denotes discharge capacity of the cells after being charged and discharged at 0.2 C before being stored at 60° C. In addition, (Rt) in FIG. 13 denotes discharge capacity measured after charging a cell at 60° C., storing the cell for 1 week, and once discharging it at 0.2 C as a capacity retention, and (Rc) in FIG. 13 denotes discharge capacity measured after charging and discharging the once discharged cell at 0.2 C as capacity recovery.

As shown in FIG. 13, the cell according to Example 5 exhibited similar discharge capacity before having been stored at a high temperature to that of the cell according to Comparative Example 1 but very excellent discharge capacity after having been stored at the high temperature compared with the cell according to Comparative Example 1.

Measurement of Impedance (Electrochemical Impedance Spectroscopy: EIS)

Figure 14A:
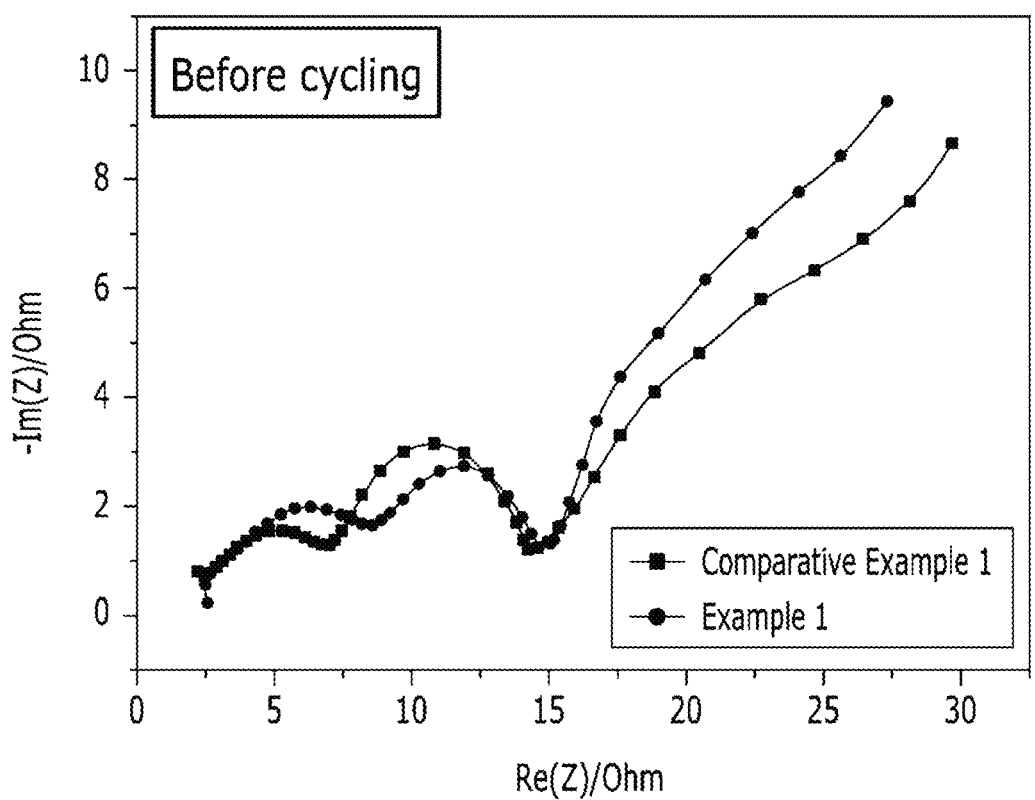
FIG. 14A is a graph showing Electrochemical Impedance Spectroscopy (EIS) results of the rechargeable lithium battery cells according to Example 1 and Comparative Example 2 before charge and discharge.
Figure 14B:
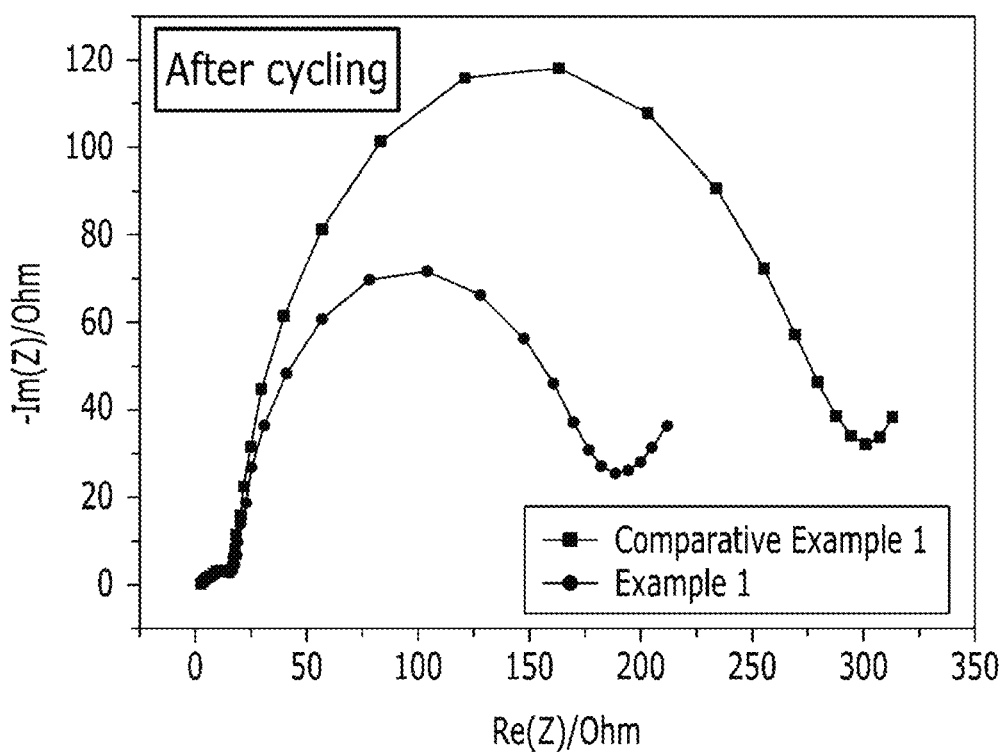
FIG. 14B is a graph showing EIS results of the rechargeable lithium battery cells according to Example 1 and Comparative Example 2 after the charge and discharge.

The cells according to Example 1 and Comparative Example 1 were 35 times charged and discharged at 1.0 C, and then, their respective impedances before and after the charge and discharge were measured, and the results are respectively provided in FIGS. 14A-14B. As shown in FIG. 14A, the impedances of Example 1 and Comparative Example 1 were similar before the charge and discharge, that is, no difference in charge movement resistance, but as shown in FIG. 14B, Example 1 exhibited sharply lower impedance compared with Comparative Example 1 after 35 times charging and discharging.

Thickness Evaluation

Figure 15:
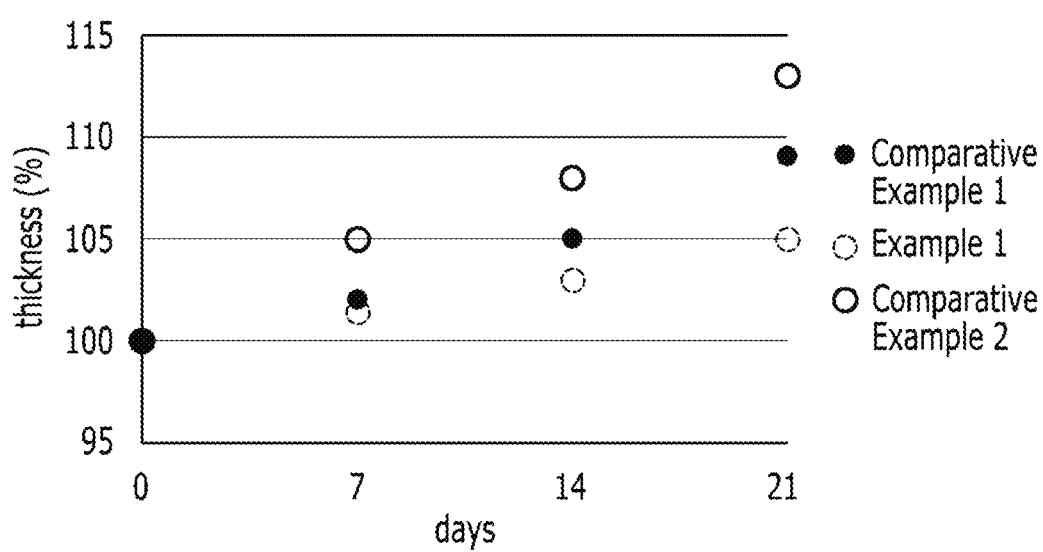
FIG. 15 is a graph showing thickness expansion ratios of the rechargeable lithium battery cells manufactured by respectively using the positive active materials according to Example 1 and Comparative Examples 1 and 2 after having been stored at a high temperature.

The thicknesses of the rechargeable lithium battery cells of Example 1 and Comparative Example 1 and 2 were measured and then the rechargeable lithium battery cells were stored at 60° C. for 21 days, and then, their thicknesses were measured at the $7^{th}$ day, the $14^{th}$ day, and the $21^{st}$ day after the storage, and their thickness increase rates relative to 100% of the thickness before the storage are shown in FIG. 15. As shown in FIG. 15, the cell of Example 1 exhibited a low thickness increase rate after 21 days, but the cell of Comparative Example 2 exhibited a very high thickness increase rate. The reason is believed to be that amorphous $Al(OH)_3$ had a high moisture content and generated substantial amounts of gas.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the appended claims, and equivalents thereof. Therefore, the aforementioned embodiments should be understood to be exemplary but not limiting the present disclosure in any way.

What is claimed is:

1. A positive active material for a rechargeable lithium battery, comprising:
 a core comprising a lithium intercalation compound; and
  a crystalline coating compound on a surface of the core and comprising a crystalline aluminum hydroxide, a crystalline aluminum oxyhydroxide, or a combination thereof wherein the crystalline coating compound is present in an island form on the surface of the core.

2. The positive active material of claim 1, wherein an average particle diameter (D50) of the coating compound is in a range of about 200 nm to about 1000 nm.

3. The positive active material of claim 1, wherein a content of the coating compound is in a range of about 0.05 mol % to about 2 mol % based on 100 mol % of the core.

4. The positive active material of claim 1, wherein the positive active material further comprises a conductive material on the surface of the core.

5. The positive active material of claim 1, wherein the coating compound has a spherical shape or a sheet shape.

6. A rechargeable lithium battery, comprising:
a positive electrode comprising the positive active material of claim 1;
a negative electrode comprising a negative active material; and
an electrolyte.

* * * * *